United States Patent
Choy et al.

(10) Patent No.: US 9,568,597 B2
(45) Date of Patent: Feb. 14, 2017

(54) ULTRASOUND CAPACITIVE T/R SWITCH DEVICE, CIRCUIT

(71) Applicant: Microchip Technology Incorporated, Chandler, AZ (US)

(72) Inventors: Benedict Choy, Cupertino, CA (US); Ching Chu, San Jose, CA (US); Andy Tu, Saratoga, CA (US)

(73) Assignee: Microchip Technology Inc., Chandler, AZ (US)

( * ) Notice: Subject to any disclaimer, the term of this patent is extended or adjusted under 35 U.S.C. 154(b) by 781 days.

(21) Appl. No.: 13/965,490

(22) Filed: Aug. 13, 2013

(65) Prior Publication Data

US 2015/0049577 A1    Feb. 19, 2015

(51) Int. Cl.
*H03K 17/16*    (2006.01)
*G01S 7/52*    (2006.01)

(52) U.S. Cl.
CPC .................................. *G01S 7/52017* (2013.01)

(58) Field of Classification Search
CPC ............ H03K 17/16; H03K 2217/0009; Y10S 367/903; G01S 7/52017
See application file for complete search history.

(56) References Cited

U.S. PATENT DOCUMENTS

| | | | | |
|---|---|---|---|---|
| 4,222,113 A * | 9/1980 | Hansen | ............... | G01S 7/52003 307/99 |
| 5,199,299 A * | 4/1993 | Hughes | ................. | B06B 1/0215 367/137 |
| 6,608,798 B2 * | 8/2003 | McCord | .................. | G01S 7/523 367/135 |
| 8,107,322 B2 * | 1/2012 | Reiche | .................. | B06B 1/0215 367/135 |
| 2003/0039173 A1 * | 2/2003 | Yurchenko | ............ | B06B 1/0215 367/138 |
| 2003/0095474 A1 * | 5/2003 | McCord | .................. | G01S 7/523 367/135 |
| 2011/0102114 A1 * | 5/2011 | Reiche | .................. | B06B 1/0215 333/81 R |
| 2015/0049577 A1 * | 2/2015 | Choy | .................. | G01S 7/52017 367/7 |
| 2015/0070034 A1 * | 3/2015 | Chu | ..................... | H03K 5/1536 324/679 |

FOREIGN PATENT DOCUMENTS

JP    02117219 A  *  5/1990

OTHER PUBLICATIONS

Lessons in Electric Circuits vol. III Chapter 9, Sep. 2011, 33 pages, http://web.archive.org/web/20110907091603/http://www.ibiblio.org/kuphaldt/electricCircuits/Semi/SEMI_9.html.*

* cited by examiner

*Primary Examiner* — Daniel Pihulic
(74) *Attorney, Agent, or Firm* — Burr & Forman LLP; Ryan M. Corbett

(57) ABSTRACT

An ultrasound image system has a plurality of channels. At least one of the plurality of channels has a capacitive T/R switch.

22 Claims, 4 Drawing Sheets

ULTRASOUND CAPACITIVE T/R SWITCH DEVICE, CIRCUIT

TECHNICAL FIELD

The present invention relates generally to an ultrasound image system circuit and, more specifically, to a novel semiconductor device for an ultrasound image system circuit as a high voltage T/R switch and voltage limiting circuit, for transmit transducer-excitation pulse and receive echo signal switching (T/R switch), protection and multiplexing circuit.

BACKGROUND

Medical or nondestructive testing (NDT) ultrasound imaging applications have a growing demand for more sophisticated transmit-pulse/echo-signal switching in the receiver frontend circuit. This may be necessary to generate high resolution acoustic images. The conventional ultrasound T/R echo switching circuits usually have an array of high-voltage diode switches or MOSFET-based voltage-controlled switch devices in between a transducer probe PZT array and Tx/Rx channel circuitry These circuits have several limitations. These circuits ether are require to have the forward bias current from two low-noise, very clean power supplies for the diode-bridge type of T/R switch, or have a quite larger size MOSFET analog switch with control circuit for the MOSFET-based type of T/R switch, which normally has higher turn-off trig voltage or current, and higher off-capacitance intrinsically. Second, the transmitting pulses are generally high voltage and the receiving echo signals are generally low voltage. However, both signals have to apply to the same T/R switch. This requires that every T/R switch must have a low on-impedance when the T/R switch is turned on, and that it can withstand high voltage when it is turned off. In order to have low on-resistance in the diode-bridge type circuit normally requires quite large forward bias current (e.g., 5 to 10 mA). Further, in a 128-channel system total power of 6.4 to 12.8 Watts of clean power supplies and 256 pieces of decoupling capacitors are also required. Additional PCB area is also required too for all these circuitry. These requirements make the cost of the T/R switch very high.

Therefore, it would be desirable to provide a circuit and method that overcomes the above problems. The circuit and method would be able to switch the echo signal to overcome the above problems.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

An ultrasound image system has a plurality of channels. At least one of the plurality of channels has a capacitive T/R switch.

An ultrasound image system has a plurality of channels. Each channel comprises a Tx pulser; a pair of isolation diodes coupled to the Tx pulser; a piezo transducer element coupled to the pair of isolation diodes; a T/R switch having a first terminal coupled to the piezo transducer; and an Rx circuit coupled to a second terminal of the T/R switch. The T/R switch of at least one of the plurality of channels is a capacitive T/R switch.

The features, functions, and advantages may be achieved independently in various embodiments of the disclosure or may be combined in yet other embodiments.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth, below in connection with the appended drawings is intended as a description of presently preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Figure 1:
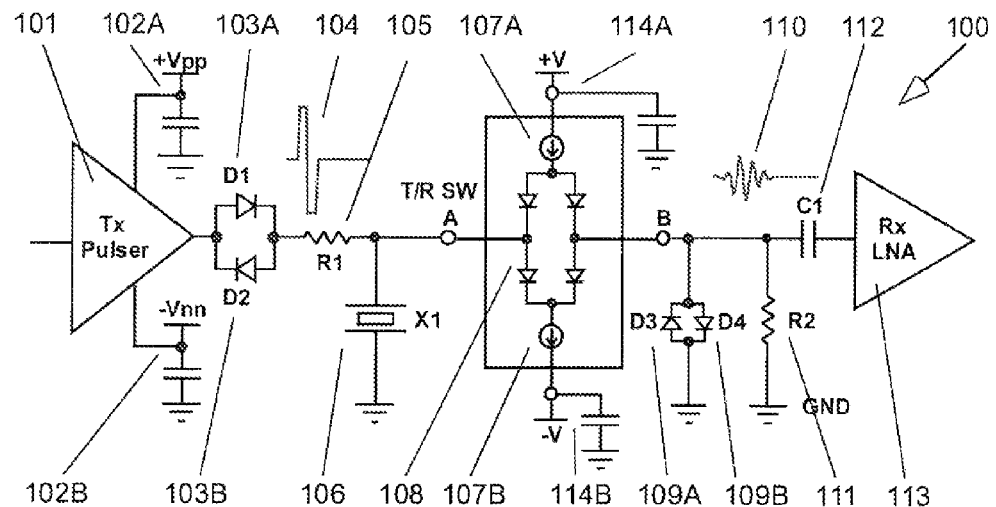
FIG. 1 is a schematic diagram illustrating a conventional high voltage diode-bridge type of T/R switch for an ultrasound image system of transmit/receive (Tx and Rx), only one of the multiple-elements array probe transducer and one channel of the multiple Tx and Rx channels being shown.

Referring to FIG. 1, in general, when a ultrasound transducer excitation pulse generated by a Tx pulser 101 (for example), the Tx pulse 104 peak to peak amplitude is approximately the same as the 102A and 102B power supplies rail voltages coupled to the Tx pulser 101. Normally the voltage may be approximately +/−2V to +/−150V. The generated transmit pulse or pulses, then travel through the echo isolation diodes 103A and 103B, and the R1 resistor 105 to reach the ultrasound transducer X1 106. The X1 transducer 106 normally is a PZT or other piezo element with large capacitance of 10 to 1000 pF and with an acoustic resonate frequency of 1 to 100 MHz range. Thus, the output of the Tx pulses 104 not only have higher voltages, but also have very high peak current and fast pulse waveform rise/fall edges. The Tx pulse or pulses 104 also meantime reach the T/R switch 108 which is connected in between the TX, Transducer and Rx circuitry. The T/R switch 108 serves as two basic functions: a) To block the high voltage Tx pulses 104, to preventing the sensitive Rx circuit from being damaged by the high voltage, high current and high frequency Tx pulses 104; b) To pass the low voltage (normally less than +/−1 mV to +/−300 mV) RF echo signals to the Rx circuit, which contents the back to back diodes protector D3 & D4 109A and 109B, the AC coupling capacitor C1 112, grounding resistor R2 111 and receive low noise preamplifier LNA 113.

As shown in FIG. 1, the ultrasound image system schematic block 100 has a conventional biased diode bridge type of T/R switch 108 with built-in constant current sources 107A and 107B powered by additional power supply rails 114A and 114B. The diodes in the T/R switch 108 are normally forward biased in order to get low forward state impedance for the Rx time since it is required to have a quite large forward current to pass each diode of the T/R switch 108. But for the Tx time in order to withstand the high voltage of the Tx pulses 104 peak to peak voltage, the diodes of the T/R switch 108 are also required to have a quite high breakdown voltage (BV). The bias current sources and power supplies also have be very low noise, plus they are shared with all multiple channels of the T/R switches 108. Thus, decoupling circuits are additionally required. Due to these features, this type of T/R switch has the noise, power supply cost and larger PCB space requirement issues disclosed above.

Figure 2:
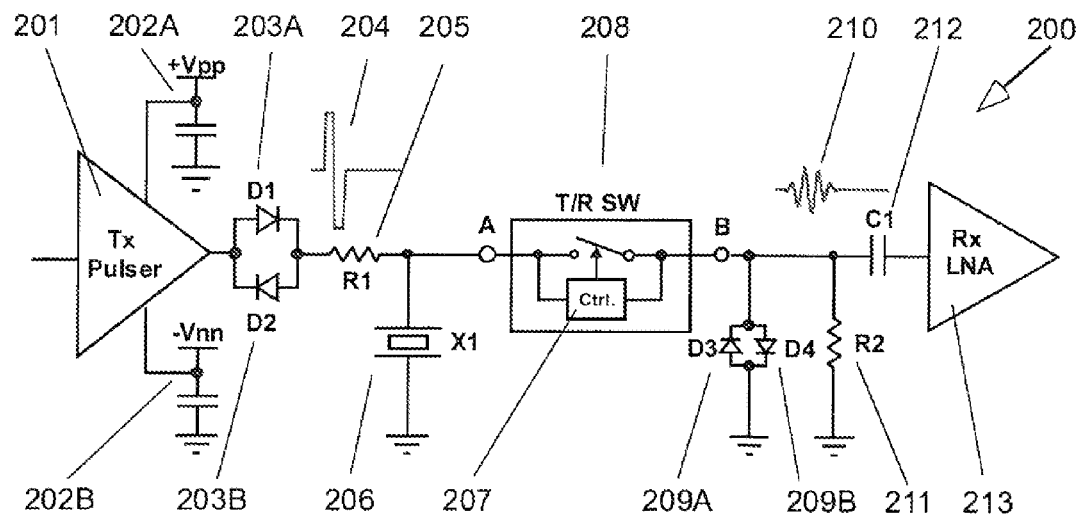
FIG. 2 is the schematic diagram illustrating a MOSFET type of T/R switch for an ultrasound image system of transmit/receive (Tx and Rx), only one of the multiple-elements array probe transducer and one channel of the multiple Tx and Rx channels being shown.

Also for comparison, as shown in FIG. 2, a schematic block diagram of an ultrasound image system 200 is shown. The system 200 has a Tx Pulser 201. Power supply rail voltages 202A and 202B are coupled to the Tx pulser 201. The generated transmit pulse or pulses from the Tx pulser 201 travel through the echo isolation diodes 203A and 203B, and the R1 resistor 205 to reach the ultrasound transducer X1 206.

In the embodiment shown in FIG. 2, a conventional MOSFET analog switch type T/R switch 208 with built-in control circuit 207 is used. The T/R switch 208 requires no additional power supply. However, due to the low Ron and high BV feature required for the MOSFETs of the T/R switch 208, the higher cost and large parasitic capacitance across the A to B terminals of the T/R switch 208 is the issue.

Like in the previous embodiment, to pass the low voltage (normally less than +/−1 mV to +/−300 mV) RE echo signals to the Rx circuit, diodes protector D3 & D4 209A and 209B, an AC coupling capacitor C1 212, grounding resistor R2 211 and receive low noise preamplifier LNA 213 may be used.

Figure 3:
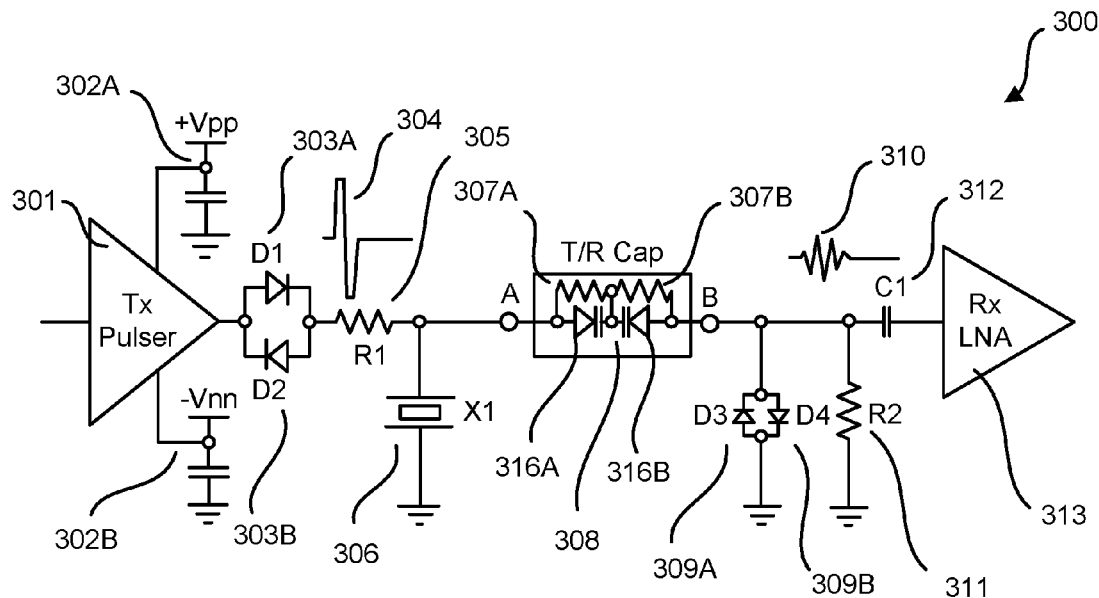
FIG. 3 is the schematic diagram illustrating a capacitive T/R switch device for an ultrasound image system of transmit/receive (Tx and Rx) in accordance with one embodiment of the present invention, only one of the multiple-elements array probe transducer and one channel of the multiple Tx and Rx channels being shown.

Referring to FIG. 3, a novel capacitive T/R switch (T/R Cap) 308 with two terminals A and B is used to replace the conventional prior art T/R switches disclosed above. The T/R switch 308 is a diode bridge type of the MOSFET type for use in an ultrasound image system 300.

The ultrasound image system 300 has a Tx Pulser 301. Power supply rail voltages 302A and 302B are coupled to the Tx pulser 301. The generated transmit pulse or pulses from the Tx pulser 301 travel through the echo isolation diodes 303A and 303B, and the R1 resistor 305 to reach the ultrasound transducer X1 306.

Like in the previous embodiment, to pass the low voltage (normally less than +/−1 mV to +/−300 mV) RF echo signals to the Rx circuit, diodes protector D3 & D4 309A and 309B, an AC coupling capacitor C1 312, grounding resistor R2 311 and receive low noise preamplifier LNA 313 may be used.

In operation, the Tx pulser 301 generates ultrasound transducer excitation pulses 304. The Tx pulse 304 peak to peak amplitude is about the same as the 302A and 302B power supplies rail voltages. Normally the voltage will be +/−2V to +/−150V. The generated transmit pulse or pulses 304, then travel through the echo isolation diodes 303A and 303B, and the R1 resistor 305 to reach the ultrasound transducer X1 306. The X1 transducer normally is a PZT or other piezo element with large capacitance of 100 to 400 pF and with an acoustic resonate frequency of 1 to 100 MHz range. Therefore the output of the Tx pulses 304 not only have a higher voltages, but also have very high peak current and fast pulse waveform rise/fall edges. The Tx pulse or pulses also meantime reach the T/R switch 308. The T/R switch 308 serves as two basic functions: a) To block the high voltage Tx pulses 304, to preventing the sensitive Rx circuit being, damaged by the high voltage, high current and high frequency Tx pulses 308; b) To pass the low voltage (normally less than +/−1 mV to +/−300 mV) RF echo signals 310 to the Rx circuit, which contents the back to back diodes protector D3 & D4 309A and 309B, the AC coupling capacitor C1 312, grounding resistor R2 311 and receive low noise preamplifier LNA 313.

The T/R switch 308 has a pair of variable capacitance diodes 316A and 316B. The anode of each variable capacitance diodes 316A and 316B form one of the terminals A or B of the T/R switch 308. A pair of high value bleed resistors 307A and 307B are provided in the T/R switch 308 and provide an initialization state. The resistors 307A and 307B can be easily integrated into a semiconductor device. The resistor value usually can be 100K to 100 MG, and due to the resistors 307A and 307B being in-parallel to the high capacitance of CJ0 device(s) at Rx state, the noise contribution is ignorable.

Figure 4:
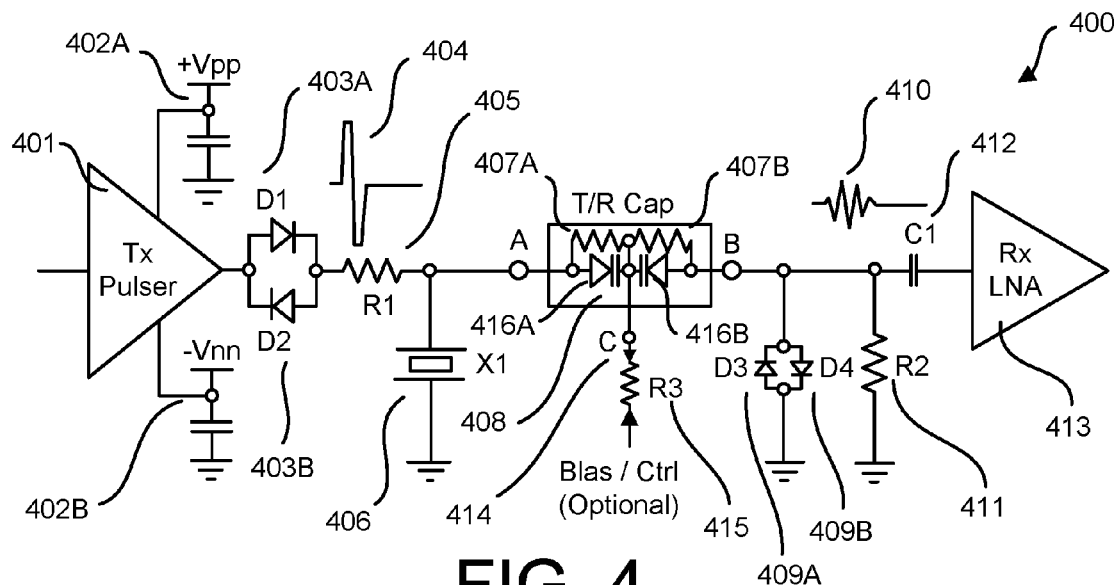
FIG. 4 is a schematic diagram illustrating the capacitive T/R switch device of the present invention with additional very low current reversed bias, or additional "ON/OFF" control features to the T/R switch.

Referring to FIG. 4, an ultrasound image system 400 has a Tx Pulser 401. Power supply rail voltages 402A and 402B are coupled to the Tx pulser 401. The generated transmit pulse or pulses from the Tx purser 401 travel through the echo isolation diodes 403A and 403B, and the R1 resistor 405 to reach the ultrasound transducer X1 406.

Like in the previous embodiment, to pass the low voltage (normally less than +/−1 mV to +/−300 mV) RF echo signals to the Rx circuit, diodes protector D3 & D4 409A and 409B, an AC coupling capacitor C1 412, grounding resistor R2 411 and receive low noise preamplifier LNA 413 may be used.

The T/R switch 408 has a pair of variable capacitance diodes 416A and 416B coupled in the same manner as the embodiment above. A pair of high value bleed resistors 407A and 407B are provided in the T/R switch 408 and provide an initialization state. The resistors 407A and 4078 can be easily integrated into a semiconductor device.

The T/R switch 408 has a third terminal 414. The third terminal 414 can easily provide a bias voltage or programmable attenuation control via a high impedance resistor 415.

Figure 5:
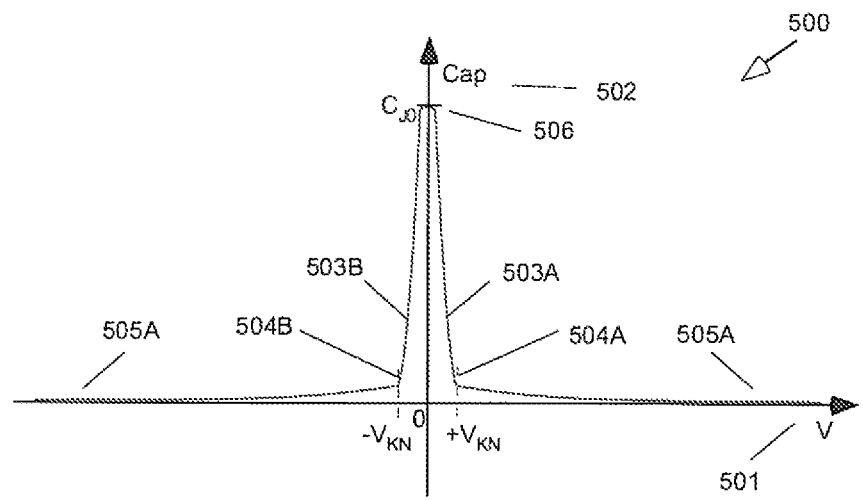
FIG. 5 is a C-V curve diagram illustrating the capacitive T/R switch device's terminal A to terminal B capacitance vs. the voltage across the two terminals.

The capacitive T/R 308/408 switch has a typical C-V curve 500 shown in FIG. 5. The capacitance between terminal A and B, at the zero terminal voltage, $C_{JO}$ is Very high 506. Normally, the $C_{JO}$ is design to be about a few hundreds of picofarad (pF) to few nanofarad (nF). When the terminal voltage increases, within +/−200-300 mV, the terminal capacitance gradually and slowly decreases. However when the terminal voltage drop further increases to about +/−0.5-0.7V, the capacitance rapidly falls the curve section of 503A and 503B shown.

Then with the absolute voltage further increases and reaches to near the +/−$V_{KN}$ voltage, this is where C-V curve knee points are, the capacitance will be only a few percent of the $C_{JO}$ value. When the terminal absolute voltage continuous to increase, the capacitance continue to decrease just like the C-V curve of a normal reverse biased P-N junction behaviors. The capacitive T/R device has breakdown voltages normally higher than the maximum Tx pulses peak to peak voltages, about +/−30 to +/−250V range.

Figure 6A:
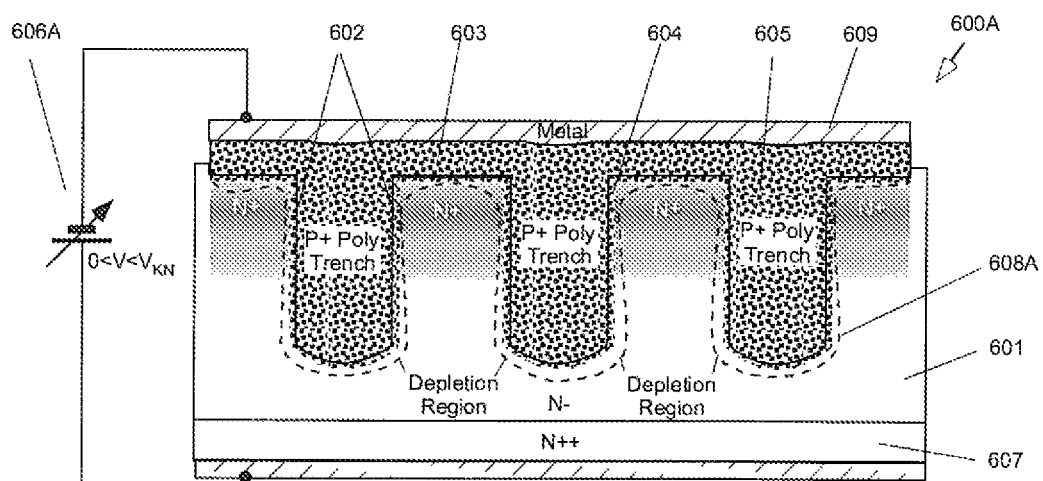
FIG. 6A is a single device semiconductor structure diagram illustrating the capacitive T/R switch device of the present invention, with zero or near zero bias voltage.
Figure 6B:
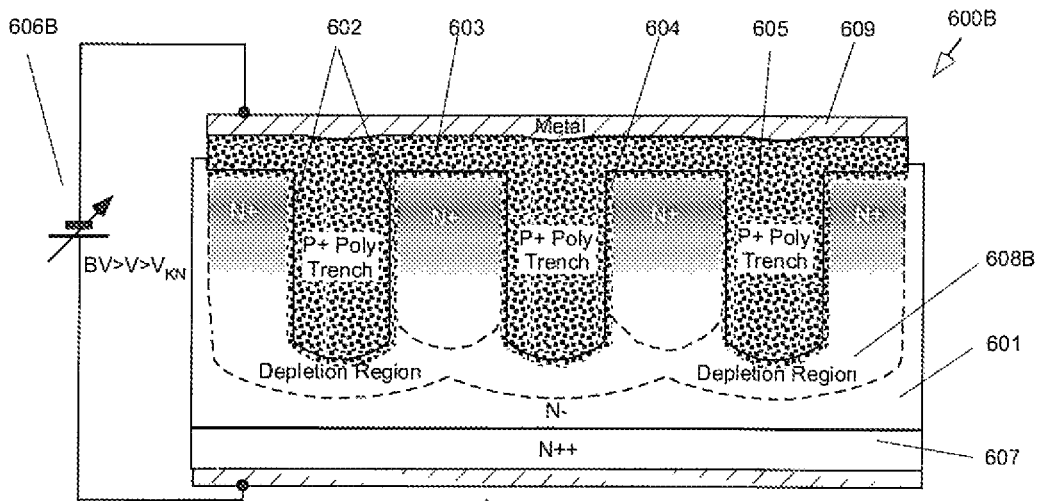
FIG. 6B is a single device semiconductor structure diagram illustrating the capacitive T/R switch device of the present invention, with larger or slightly larger than knee voltage ($V_{KN}$) voltage(s)

In the present invention, the capacitive T/R switch 308/408 may be implemented using a specially designed semiconductor device as shown in FIGS. 6A and 6B. FIGS. 6A and 6B show devices 600A and 600B respectively. Both devices 600A and 600B may be fabricated on an n-type semiconductor substrate material 601. Each n-type semiconductor substrate material 601 may have a plurality of p-type Poly-Silicon 603 material in the trenches 602. Because of the vertical structure of the trenches 602, there are larger areas of the P-N junction that are present on the side walls of each trench 602, as well as only very small percentage of the same type of junction at the bottom of the trenches 602.

Due to the concentration of N+ area that is much higher than the N− area, the unit area junction capacitance of the side walls is higher. When the terminal voltage 606A is at zero or near zero, all the function areas together contribute to the junction capacitance, as a large $C_{JO}$. When terminal voltage 606B increases to the knee or near knee voltage +/−$V_{KN}$, the depletion region between two trenches 602 are pinched off. The effective reversed biased P-N junction are suddenly and quickly reduces to very small area, which is only the bottom area of the trench 602. Therefore the effective junction capacitance rapidly is reduced. The 608A shows the depletion area of zero or near zero bias and the 608B when the bias at near knee voltage or higher as shown the FIG. 6B. The device has the metals of 607 as the cathode and 609 as the anode terminal connections respectively.

Figure 7:
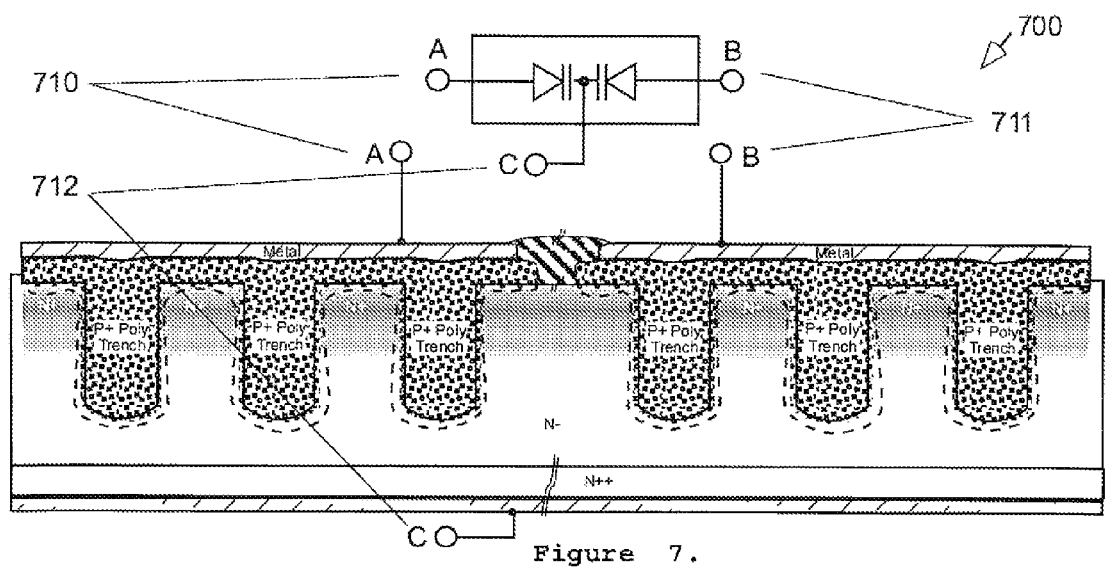
FIG. 7 is a back to back dual devices semiconductor structure diagram illustrating the capacitive T/R switch device of the present invention, with three terminals, also shown is the schematic symbol of the new device with the corresponding terminals.

In the present invention, the capacitive T/R switch is implemented using a pair of the said semiconductor device as shown in the FIG. 7. The 700 is fabricated with two separated group of said of p-type Poly-Silicon trenches. The back-to back devices has common cathode 712 metal, and the two anodes metal 710 and 711 as the terminals-A and the terminals-B. The simplified schematic symbol, without the initialization bleed-resistors, is shown above in the FIG. 7 correspondingly While embodiments of the disclosure have been described in terms of various specific embodiments, those skilled in the art will recognize that the embodiments of the disclosure may be practiced with modifications within the spirit and scope of the claims.

What is claimed is:

1. An ultrasound image system comprising:
    a plurality of channels, wherein at least one of the plurality of channels has a capacitive T/R switch and a piezo transducer element coupled to the capacitive T/R switch.

2. The ultrasound imaging system of claim 1, wherein the capacitive T/R switch comprises:
    a pair of capacitive diodes; and
    a pair of bleed resistors coupled to the pair of capacitive diodes.

3. The ultrasound system of claim 1, wherein the capacitive T/R switch comprises:
    a first variable capacitive diode, a terminal of the first variable capacitive diode forming a first terminal of the T/R switch;
    a second variable capacitive diode, a terminal of the second variable capacitive diode forming a second terminal of the T/R switch; and
    a pair of bleed resistors coupled to the first variable capacitive diode and the second variable capacitive diode.

4. The ultrasound imaging system of claim 1, further comprising a bias control device coupled to the capacitive T/R switch.

5. The ultrasound imaging system of claim 3, further comprising a bias control device coupled to a third terminal of the capacitive T/R switch.

6. The ultrasound imaging system of claim 1, wherein the at last one channel comprises:
    a Tx pulser;
    a pair of isolation diodes coupled to the Tx pulser; and
    an Rx circuit coupled to a second terminal of the capacitive T/R switch;
    wherein the piezo transducer element is coupled to the pair of isolation diodes and to a first terminal of the capacitive T/R switch.

7. The ultrasound imaging system of claim 6, wherein the Rx circuit comprises:
    a pair of diode protectors coupled to the second terminal of the capacitive T/R switch;
    a coupling capacitor coupled to the pair of diode protectors; and
    a low noise preamplifier coupled to the coupling capacitor.

8. The ultrasound imaging system of claim 1, wherein the capacitive T/R switch generates a C-V curve having a rapidly capacitance falling area between near zero and knee point of voltages.

9. The ultrasound imaging system of claim 1, wherein the capacitive T/R switch is a semiconductor device comprising:
    an N-type substrate having a plurality of trenches formed therein;
    a P-type poly-Silicon material formed within each of the plurality of trenches; and
    metal layers applied to the N-type substrate and the P-type poly-Silicon to form terminals of the capacitive T/R switch.

10. The ultrasound imaging system of claim 1, wherein the capacitive T/R switch is a semiconductor device comprising:
    a P-type substrate having a plurality of trenches formed therein;
    a N-type poly-Silicon material formed within each of the plurality of trenches; and
    metal layers applied to the P-type substrate and the N-type poly-Silicon to form terminals of the capacitive T/R switch.

11. The ultrasound imaging system of claim 9, wherein a junction capacitance of at least two of the trenches changes with a terminal voltage.

12. The ultrasound imaging system of claim 9, wherein a junction capacitance of at least two of the trenches changes with a terminal voltage, the junction capacitance having a C-V curve having a rapid dC/dV turning knee point.

13. An ultrasound image system comprising:
a plurality of channels, wherein each channel comprises:
a Tx pulser;
a pair of isolation diodes coupled to the Tx pulser;
a piezo transducer element coupled to the pair of isolation diodes
a T/R switch having a first terminal coupled to the piezo transducer; and
an Rx circuit coupled to a second terminal of the T/R switch;
wherein the T/R switch of at least one of the plurality of channels is a capacitive T/R switch.

14. The ultrasound imaging system of claim 13, wherein the capacitive T/R switch comprises:
a pair of diodes; and
a pair of bleed resistors coupled to the pair of diodes.

15. The ultrasound imaging system of claim 13, wherein the capacitive T/R switch comprises:
a first variable capacitive diode, an anode of the first variable capacitive diode forming a first terminal of the T/R switch;
a second variable capacitive diode, an anode of the second variable capacitive diode forming a second terminal of the T/R switch; and
a pair of bleed resistors coupled to the first variable capacitive diode and the second variable capacitive diode.

16. The ultrasound imaging system of claim 13, further comprising a bias control device coupled to a third terminal of the capacitive T/R switch.

17. The ultrasound imaging system of claim 13, wherein the capacitive T/R switch generates a C-V curve having a rapidly capacitance falling area between near zero and knee point of voltages.

18. The ultrasound imaging system of claim 12, wherein the capacitive T/R switch is a semiconductor device comprising:
an N-type substrate having a plurality of trenches formed therein;
a P-type poly-Silicon material formed within each of the plurality of trenches; and
metal layers applied to the N-type substrate and the P-type poly-Silicon to form terminals of the capacitive T/R switch.

19. The ultrasound imaging system of claim 12, wherein the capacitive T/R switch is a semiconductor device comprising:
n P-type substrate having a plurality of trenches formed therein;
a N-type poly-Silicon material formed within each of the plurality of trenches; and
metal layers applied to the P-type substrate and the N-type poly-Silicon to form terminals of the capacitive T/R switch.

20. The ultrasound imaging system of claim 18, wherein a junction capacitance of at least two of the trenches changes with a terminal voltage.

21. A capacitive T/R switch comprising:
a pair of capacitive diodes; and
a pair of bleed resistors coupled to the pair of capacitive diodes.

22. The capacitive T/R switch of claim 21, wherein the pair of diodes comprises:
a first variable capacitive diode, a terminal of the first variable capacitive, diode forming a first terminal of the T/R switch; and
a second variable capacitive diode, a terminal of the second variable capacitive diode forming a second terminal of the T/R switch.

* * * * *